United States Patent Office 3,157,202
Patented Nov. 17, 1964

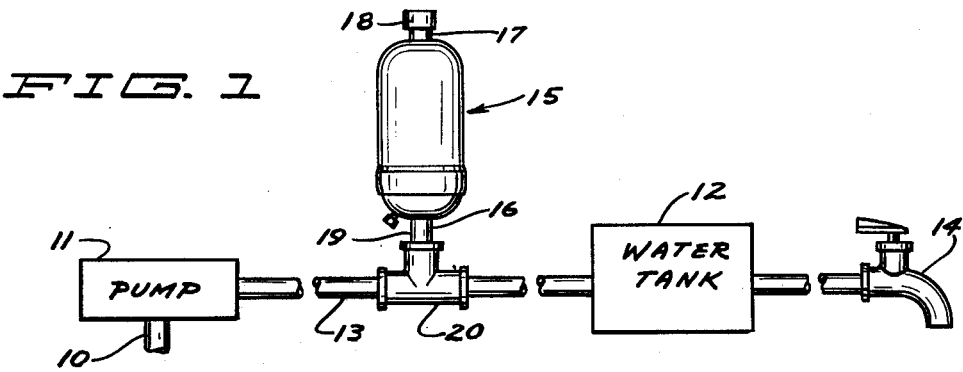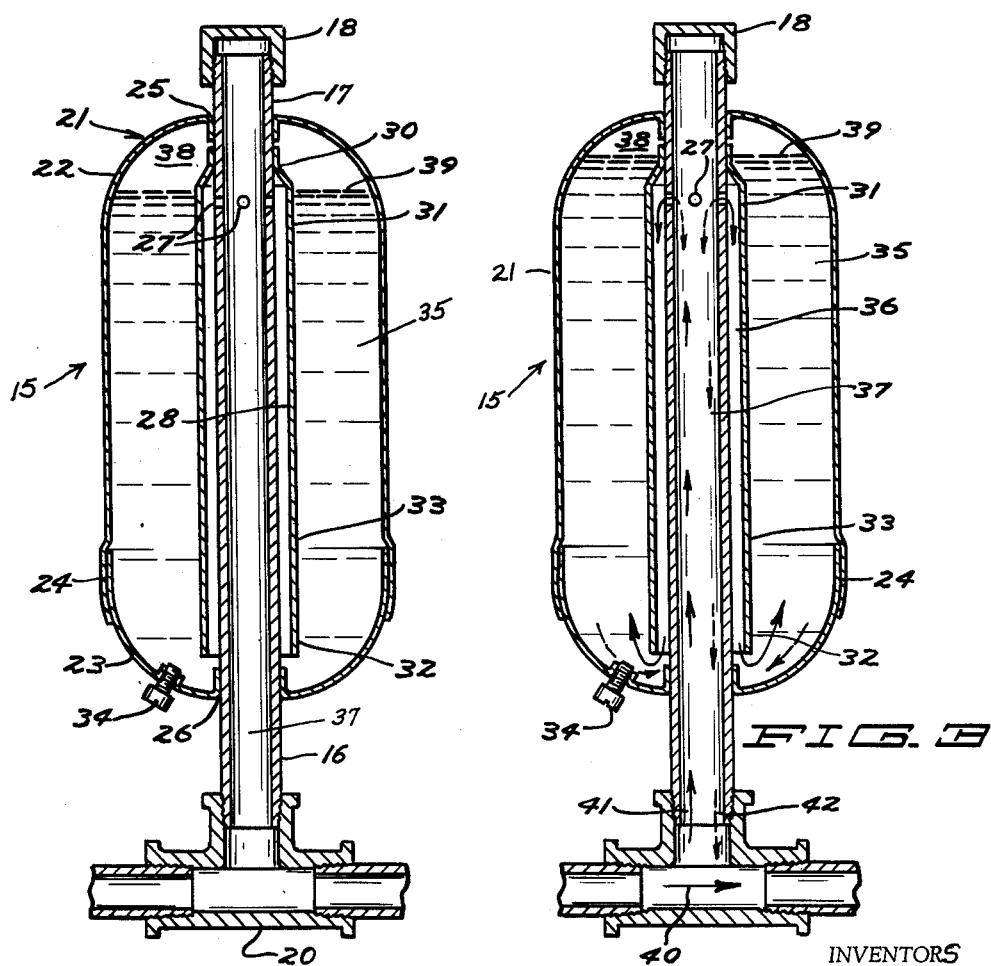

3,157,202
SURGE TANK
Harry J. Sadler, Minneapolis, and Ernest E. Cook, Anoka, Minn., assignors to Hypro Engineering, Inc., Minneapolis, Minn., a corporation of Minnesota
Filed Sept. 5, 1961, Ser. No. 136,086
3 Claims. (Cl. 138—26)

This invention relates to surge tanks and more particularly to an improvement in existing surge tanks.

The surge tank is a fluid tank employed to absorb irregularities of flow in main supply lines. It may be used where the flow is constant but where the volume passing one point in a pumping cycle varies from that in another, for example, in the common household pressure system wherein water is drawn off from a supply tank and replenished thereto by a common piston pump. Another example would be where water is pumped at high pressures for spraying vegetation, such as fruit orchards.

Presently known designs of the surge tank include a simple water reservoir which is positioned on the main water feed line between the pump and pressure tank reservoir. The usual surge tank has a portion of its volume filled with water and the remainder with air under pressure. Water surges are then absorbed by compression of the air in the tank.

Interesting phenomena concerning the water surge tank operation is that the air contained in the tank, which is under pressure, may be rapidly absorbed if the surging fresh water is relatively cool. The warmer the surging water is, the less the absorption that takes place. Likewise, if the surge water is under appreciable agitation, a greater quantity of air will be absorbed than if the surge water was in a relatively stable or low agitation stage. Because of this phenomenon surge tanks must necessarily be provided with an air supply to replenish the depleting air due to the absorption.

In the conventional and now existing surge tanks of the simple bulk chamber design, the usual air supply, under pressures in the neighborhood of 500 pounds per square inch, will have an effective duration of approximately 45 minutes to an hour. Thus, at the end of the 45 minutes to an hour, when the air is depleted, the surge tank will be ineffective because it becomes completely filled with water. Since water is relatively incompressible under normal operating pressures in surge tanks, it is readily seen that the surge tank becomes useless and must be supplied with new air for proper operation. It is therefore a general object of this invention to improve upon the air absorbing characteristics of the present surge tank designs. With the improvements which will be explained subsequently, it is found that the air supply usually lasting 45 minutes will not last for over four hours thereby substantially reducing what is commonly referred to in the art as "water-logging."

An object of this invention is to provide an improved surge tank which delays the rate of air absorption by minimizing the air and water mixture resulting from high water turbulence as well as the intermixing of the tank water with the surging fresh water.

Another object of this invention is to provide an improved surge tank as set forth above which operates at an optimum efficiency and reliability yet lends itself to economical construction.

A futher object of this invention is to provide an improved surge tank which may be positioned either above or below the main delivery fluid line to which it is connected.

A still further object is to provide an improved surge tank as described which has increased structural support to prevent rupture caused by high pressures.

These and other objects and advantages of the invention will more fully appear from the following description made in connection with the accompanying drawing wherein like reference characters refer to the same or similar parts throughout the several views and in which:

FIGURE 1 is a diagrammatic representation of a water system employing a surge tank;

FIGURE 2 is an enlarged cross-sectional side view of the surge tank at a steady state condition; and FIGURE 3 is a view similar to that of FIGURE 2 but showing the operation of the improved surge tank during the pressure surge.

Referring now more particularly to FIGURE 1, a typical water system is shown having the principal elements thereof in diagrammatical representation. Fresh water is supplied through an inlet pipe 10 to a pump 11 which is usually of the piston type. The pump 11 in turn supplies water under pressure to a storage water tank 12, via outlet pipe line 13. Number 14 represent a conventional water faucet for drawing water off of tank 12 under pressure.

Interposed between the pump 11 and water tank 12, and connected to line 13, is a surge tank 15. In this improved form of surge tank, an upstanding surge tube 16 extends through the outer shell of the surge tank and has an upper projecting portion 17, which is sealed with cap 18, and a lower portion 19 which is threadably engaged into T-coupling 20.

For a more detailed explanation of the improved surge tank construction and operation, reference will now be made to FIGURES 2 and 3.

The surge tank 15 has a main tank or outer shell 21 consisting of an upper portion 22 and a lower portion 23 which are secured together at joint 24. Upper portion 22 is soldered or welded at joint 25 to surge tube 16 and lower portion 23 is likewise secured to the surge tube 16 at joint 26. Joint 24 may be conveniently threaded or soldered together. The overall length of the shell 21 in a practical application may be approximately eight to ten inches.

As seen in FIGURE 2, the surge tube 16 has a plurality of restricted apertures 27 spaced at intervals around the surge tube and extending therethrough. The purpose of the apertures will be explained subsequently.

Secured to the surge tube 16 at the upper end 17 and between joint 25 and apertures 27 is a sleeve shield 28 which has a reduced annulus 30 at the upper end 31 and a termination downward in a free end 32 at lower end 33. The reduced annulus 30 may be soldered or welded upon surge tube 16 in order to orient the sleeve shield in concentric relation to the surge tube.

Lower shell 23 is provided with a drain plug 34 for draining and flushing of the surge tank at periodic intervals.

With the above elements structurally related as shown, a main chamber 35 is provided which is defined by the upper and lower portions 22 and 23 respectively, of shell 21, and sleeve shield 28. In addition, sleeve shield 28, and surge tube 16 define a surge chamber 36, and the surge tube in cooperation with cap 18 defines a tube chamber 37.

In the operation of this improved surge tank, the water pressure built up by pump 11 will cause the tube chamber 37 and surge chamber 36 to become completely filled with water. In addition the main chamber 35 will become filled with water until the pressure in area 38 of air is equal to the pressure of the water in pipeline 13. Thus, air-water interface 39 will be near the upper end of the shell as shown in FIGURE 2. While the air-water interface 39 is normalizing to this position, the water is, of course, forced out of tube chamber 27 via apertures 27 into surge chamber 36 and then ultimately into main chamber 35.

Assuming now that a pressure pump 11 is of the piston type, it is inherent that the pressure stroke of the pumping cycle will cause higher pressure han the average normal pressure. For example, if the pump were designed for 500 p.s.i. of pressure, then the peak pressure surge may reach as much as 550 to 600 p.s.i. FIGURE 3 represents the water flow at such an instant wherein arrow 40 represents the main water flow and arrow 41 in solid line represents the surge causing an increase in pressure which is to be smoothed or stabilized as the water is forced into tube chamber 37. The fresh water already within the tube chamber is forced into surge chamber 36 through restricted apertures 27. The water contained within surge chamber 36 will simultaneously be forcefully expelled into main chamber 35 via the lower free end 32. By increasing the water contained within main chamber 35, it may be seen, as in FIGURE 3, that the air-water interface 39 rises thereby compressing the air space 38.

Once the peak of the surge pressure has beeen reached, the water in the surge tube then flows reversely and follows the direction of dotted arrow 42. With decreased pressure in the pipeline 13, the increased pressure in main chamber 35 will cause a small amount of water to return into surge chamber 36 and the water now confined in the surge chamber, expelled via restricted apertures 27 into tube chamber 37.

Through the above description of the surge tank operation, it is seen that the water contained within main chamber 35 is relatively unchanged and undisturbed as a result of the laminar flow of the exchanging water around lower free end 32 of the sleeve shield 28. Assuming that the water contained in main chamber 35 is relatively warm, the water then will have only a slight degree of increased air absorption during the peak pressure. The water within tube chamber 37, however, is greatly agitated and cooled by fresh water supply from the pipeline.

By the novel design of this surge tank, the cool water within tube chamber 37 is relatively isolated from the warmer water within main chamber 35 by the intermediate water in surge chamber 36. Thus, the cooler water may enter the surge tank and oscillate in appreciable agitation but have little effect upon the main chamber water which in effect is aerated to an appreciable degree and will not therefore absorb at an appreciable rate the remaining air 38. The principal turbulence is confined to the small volume of tube chamber 37 and surge chamber 36, yet the benefit of the entire surge tank is retained.

It has been found that the elements as set forth above and interrelated will have an optimum operating efficiency if the apertures are approximately three-sixteenths inch in diameter. The size, of course, may vary according to the size of the surge tank, the pressures employed and the particular fluid being worked upon. It has also been found that in the above described surge tank, four apertures 27 are adequate. However, the number again may vary according to demand.

It is therefore recognized that through the above improvement in surge tanks, much more desirable operation is achieved for a greater period of operating time. The means utilized is simple, reliable and highly efficient.

It will, of course, be understood that various changes may be made in the form, details, arrangements and proportions of the parts without departing from the scope of the invention as set forth in the appended claims.

What is claimed is:

1. A surge tank comprising, a main tank, an upstanding surge tube extending into said tank, said surge tube defining a tube chamber partially extending into said main tank, a plurality of restrictive apertures spaced around said surge tube within said main tank, and a sleeve shield positioned about said surge tube and secured to said surge tube above said apertures at the upper end thereof, the annular cross-sectional area between said surge tube and said sleeve shield being greater than the total area of said plurality of restrictive apertures, said sleeve shield and said surge tube defining therebetween a surge chamber into which fluid flows from said restrictive apertures.

2. A surge tank comprising, a main tank, an upstanding elongated surge tube extending through said tank, one end thereof adapted to be secured to a fluid line and the other end being closed, said surge tube defining a tube chamber within said main tank, a plurality of restricted apertures spaced around said surge tube, and a sleeve shield positioned about said surge tube within said main tank and secured thereto at the upper end above said apertures, said sleeve shield extending downwardly for substantially the length of said main tank, and defining a surge chamber into which fluid flows from said restricted apertures, the annular cross-sectional area between said surge tube and said sleeve shield being greater than the total area of said plurality of restrictive apertures.

3. A surge tank comprising, a main tank, a surge tube extending through said tank in upstanding relation and sealed thereto, said tube having an upper closed end terminating adjacent said tank and a lower end adapted to be secured to a fluid line, said surge tube also having a plurality of restrictive apertures spaced therearound adjacent said upper closed end but within said tank, a sleeve shield coaxially positioned about said tube and within said tank, said sleeve shield having an upper reduced annulus secured and sealed to said surge tube above said apertures and a free end terminating downwardly adjacent the bottom of said tank, the annular cross-sectional area between said surge tube and said sleeve shield being greater than the total area of said plurality of restrictive apertures, said sleeve shield and said surge tube defining therebetween a surge chamber into which fluid flows from said restrictive apertures.

References Cited in the file of this patent

UNITED STATES PATENTS

| 696,277 | Sponseller et al. | Mar. 25, 1902 |
| 1,799,968 | Gillen | Apr. 7, 1931 |

FOREIGN PATENTS

| 69,800 | France | Dec. 20, 1865 |

UNITED STATES PATENT OFFICE
CERTIFICATE OF CORRECTION

Patent No. 3,157,202　　　　　　　　　　　　November 17, 1964

Harry J. Sadler et al.

It is hereby certified that error appears in the above numbered patent requiring correction and that the said Letters Patent should read as corrected below.

Column 1, line 53, for "not" read -- now --; column 2, line 19, for "represent" read -- represents --; line 71, for "27" read -- 37 --; column 3, line 5, for "han" read -- than --.

Signed and sealed this 6th day of April 1965.

(SEAL)
Attest:

ERNEST W. SWIDER　　　　　　　　　　　　EDWARD J. BRENNER
Attesting Officer　　　　　　　　　　　　Commissioner of Patents